(12) United States Patent
Kim et al.

(10) Patent No.: US 9,818,301 B2
(45) Date of Patent: *Nov. 14, 2017

(54) LANE CORRECTION SYSTEM, LANE CORRECTION APPARATUS AND METHOD OF CORRECTING LANE

(71) Applicant: LG INNOTEK CO., LTD., Seoul (KR)

(72) Inventors: Ki Dae Kim, Seoul (KR); Jeong Woo Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 83 days.

This patent is subject to a terminal disclaimer.

(21) Appl. No.: 15/006,654

(22) Filed: Jan. 26, 2016

(65) Prior Publication Data

US 2016/0140848 A1    May 19, 2016

Related U.S. Application Data

(63) Continuation of application No. 13/755,855, filed on Jan. 31, 2013, now Pat. No. 9,257,043.

(30) Foreign Application Priority Data

Sep. 3, 2012   (KR) .................. 10-2012-0097058

(51) Int. Cl.
   *H04N 7/18*        (2006.01)
   *G08G 1/16*        (2006.01)
   *G08G 1/0967*      (2006.01)
   *G06K 9/00*        (2006.01)

(52) U.S. Cl.
   CPC .......... *G08G 1/167* (2013.01); *G06K 9/00798* (2013.01); *G08G 1/0967* (2013.01)

(58) Field of Classification Search
   USPC ....... 348/148, 149, 142, 130, 173, 120, 118, 348/116, 135, 94, 63, 50, 49, 211.8, 348/211.9, 211.14, 231.9, 236, 237, 238, 348/425.2, 466, 608, 636, 837, 227.1, 348/230.1, 231.3, 231.5, 260, 294, 658, 348/680, 693, 706, 714, 725; 340/905,
   (Continued)

(56) References Cited

U.S. PATENT DOCUMENTS 5,955,967 A      9/1999   Yamada
7,216,023 B2 *   5/2007   Akita ............... B62D 15/025
                                                        348/148
(Continued)

*Primary Examiner* — Jefferey F Harold
*Assistant Examiner* — Mustafizur Rahman
(74) *Attorney, Agent, or Firm* — Saliwanchik, Lloyd & Eisenschenk

(57) ABSTRACT

The embodiment provides a method of correcting a lane. The method includes receiving first lane information detected by a lane departure warning system; comparing the received first lane information with previously stored second lane information to identify a degree of variation of a lane as a function for time; sensing whether a fault detection of the received first lane information exists according to the identified degree of variation of the lane; correcting the received first lane information when the fault detection of the first lane information is sensed; and transmitting the corrected lane information to the lane departure warning system.

17 Claims, 8 Drawing Sheets

(58) Field of Classification Search
USPC ....... 340/904, 903, 902, 928, 933, 988, 989, 340/992, 993, 994, 435; 382/103, 104
See application file for complete search history.

(56) References Cited

U.S. PATENT DOCUMENTS

| | | | |
|---|---|---|---|
| 7,557,732 B2 * | 7/2009 | Kataoka | B60W 50/14 340/435 |
| 7,920,721 B2 | 4/2011 | Unoura | |
| 7,933,433 B2 * | 4/2011 | Ogawa | G01S 17/936 382/104 |
| 8,050,456 B2 * | 11/2011 | Nakamori | G06K 9/00798 382/103 |
| 8,208,021 B2 * | 6/2012 | Unoura | G06K 9/00798 348/148 |
| 8,244,410 B2 | 8/2012 | Wu et al. | |
| 8,472,673 B2 * | 6/2013 | Kuehnle | G06K 9/00798 382/104 |
| 8,781,644 B2 | 7/2014 | Samukawa et al. | |
| 9,035,758 B2 * | 5/2015 | Maass | B60Q 9/008 340/435 |
| 9,233,644 B2 * | 1/2016 | Shimomura | E01C 23/01 |
| 2002/0042676 A1 * | 4/2002 | Furusho | G05D 1/0246 701/300 |
| 2003/0067396 A1 | 4/2003 | Hassett | |
| 2003/0103649 A1 * | 6/2003 | Shimakage | G06K 9/00798 382/104 |
| 2003/0128106 A1 | 7/2003 | Ross | |
| 2005/0096826 A1 | 5/2005 | Iwasaka et al. | |
| 2005/0265579 A1 * | 12/2005 | Nishida | G06K 9/00798 382/103 |
| 2006/0145893 A1 | 7/2006 | Hassett | |
| 2006/0176210 A1 * | 8/2006 | Nakamura | B60R 1/00 342/45 |
| 2006/0233424 A1 | 10/2006 | Miyajima et al. | |
| 2010/0063649 A1 * | 3/2010 | Wu | B60Q 9/008 701/1 |
| 2010/0238283 A1 * | 9/2010 | Kim | G06T 7/73 348/135 |
| 2010/0299000 A1 | 11/2010 | Nakamura et al. | |

* cited by examiner

LANE CORRECTION SYSTEM, LANE CORRECTION APPARATUS AND METHOD OF CORRECTING LANE

CROSS-REFERENCE TO RELATED APPLICATIONS

This application is a continuation of U.S. application Ser. No. 13/755,855, filed Jan. 31, 2013, which claims the benefit under 35 U.S.C. §119 of Korean Patent Application No. 10-2012-0097058, filed Sep. 3, 2012, which are hereby incorporated by reference in their entirety.

BACKGROUND

The embodiment relates to a lane correction apparatus, and more particularly, to a lane correction system which can correct abnormally varied lane information detected by a Lane Departure Warning System (LDWS), and a lane correction apparatus and a method of correcting a lane thereof.

Recently, as performance of computer hardware has been developed, computer vision and image processing technologies have been rapidly developed, so that high resolution video data can be analyzed and processed in real time.

Research and studies for applying such a computer vision to a vehicle have been actively done to reduce a traffic accident rate. In addition, research for an intelligent vehicle has been actively performed in connection with high-technology industry of $21^{st}$ Century.

Further, interest in the image processing application in the general vehicle field as well as the intelligent vehicle field has been increased.

A vehicle black box, which has been recently released to market, includes an impact sensor and an image sensor and stores images taken before and after traffic accident occurs. The black box may be utilized as evidence for determining one's mistake. As the demand for the vehicle black box has been increased, providers have exerted an effort to additionally provide functions related to safety, such as a lane departure detection and warning, to the vehicle black box.

Meanwhile, vehicles are driven at high speed in well-paved lanes such as lanes in South Korea. For using the intelligent vehicle in real life, the process of exact computation is required without performance degradation at high driving speed. Thus, optimization of software algorithm has been requested as well as the development of hardware.

Many studies related to lane recognition have been pursued in the inside and the outside of the country. Typical schemes for recognizing a lane include a scheme of using the Hough transformation, a scheme of using a histogram, and a scheme of using edge connection information.

First, the scheme of using the Hough transformation is a normal lane detection scheme. The Hough transformation, which is generally used in the computer vision and image processing fields, detects an object which can be modeled by using a polynomial expression existing in an image. The Hough transformation may obtain an excellent result and represent a superior feature against noise.

According to a method applied to a lane recognition algorithm by utilizing a scheme of detecting a straight line using the Hough transformation, iterative binarization using an average value is performed based on the fact that a lane has a brightness value distinctly distinguished from that of a road area in a rod image.

In order to detect a lane in a binarization image, the edges are detected by using the Sobel operator and thinning is performed for reducing an amount of Hough transformation calculations. Then, the pixel domain is converted into the parameter domain through the Hough transformation, so several candidate points for the straight lines are calculated near a coordinate in which a lane exists.

The pixels of the accumulated candidate points for the straight lines are added up and the maximum value thereof is detected to select one straight line on the pixel domain to recognize the lane.

Second, the scheme of recognizing a lane through a histogram calculates a histogram of a gray level in order to sense a lane in a road image. After forming a narrow horizontal band in the road image, the image is scanned from the bottom to the top thereof and calculates histograms of corresponding bands every scanning step for the thresholding to the maximum value. Thus, the lane is recognized by combining the band subject to the thresholding and the binary image includes all of the lanes and other objects.

Next, features are extracted from the binary image which is divided based on histograms, by using various information including an average angle in corporation with a vanishing point of each pixel of an object, a center of an object, a size of an object, a maximum width of an object, and a y-coordinate at which a maximum width and a maximum value of an object are located.

The extracted features are clearly classified through a decision tree and the candidates that finally remain are detected as the lane through a procedure of analyzing a relationship between the road and the lane.

Third, the scheme of recognizing a lane through edge connecting information uses a clustering scheme. According to the scheme of recognizing a lane through edge connecting information, the image information acquired through a camera is divided into a left image and a right image and then, clustering is performed by using edge pixels of the lane extracted through the Sobel operation.

The clustering procedure first selects an edge pixel serving as a starting point and designates ID. Then, a pixel of which the distance from the starting point to the pixel is less than the length of 2 pixels is found among edge pixels near the starting point as the edge pixel, and the same ID of that of the starting point is assigned to the found pixel. Each sub-pixel to which the ID is assigned becomes the starting point, so sub-pixels thereof are again found through the same scheme as described above.

If the edge pixel does not exist in the range of two pixels, another pixel to which any IDs are not assigned is found and then, after a new ID is assigned thereto, the same procedure as described above is repeated. If the clustering is completed, the minimum and maximum y values of each cluster and x-coordinate value corresponding to the y values are obtained. The two coordinate values are used to obtain straight line equations of each cluster and an extending line is calculated through the equations. In order to measure a distance between the clusters, two points about two y values which are equal to each other are calculated through the each cluster equation, thereby obtaining the difference with respect to the widths of lanes. The two clusters having minimum difference values are recognized as the lane.

However, since the above scheme of detecting a lane does not provide a function for correcting detected lane information, when a fault lane is detected, exact information cannot be provided to a user, so the user may feel inconvenienced.

That is, as described above, in a case of a lane departure warning system based on an image, the fault detection is instantly increased under some circumstances, such as abrasion of the lane, complex situation of a city or complex noise caused by a sign board.

BRIEF SUMMARY

The embodiment provides a lane correction system, a lane correction apparatus and a method for correcting a lane thereof to correct abnormal lane information detected by a lane departure warning system.

Further, the embodiment provides a lane correction apparatus and a method for correcting a lane thereof to correct lane information based on a variation of lane information as a function for time, thereby improving the performance of the lane departure warning system and providing more correct information to a user.

The technical tasks which will be achieved in the proposed embodiments are not limited to above, and other technical tasks, which are not mentioned, will be apparently understood to those skilled in the art.

According to an embodiment, there is provided a lane correction system including an image acquisition apparatus for acquiring a forward image in front of a vehicle; a lane detection apparatus for receiving the forward image from the image acquisition apparatus to detect lane information based on the forward image; and a lane correction apparatus for receiving first lane information detected at a present time from the lane detection apparatus and for sensing whether a fault detection of the first lane information exists by comparing the first lane information with second lane information which is previously stored, wherein the lane correction apparatus corrects the first lane information when the fault detection is sensed in the first lane information and transfers the corrected first lane information to the lane detection apparatus.

According to an embodiment, there is provided a lane correction apparatus including a lane information transceiving unit connected to a lane departure warning system for receiving first lane information detected by the lane departure warning system; a lane feature generating unit for comparing the first lane information received at a present time point through the lane information transceiving unit with second lane information previously stored in order to generate a feature of the first lane information according to a comparison result; a lane fault detection sensing unit for identifying a degree of variation of a lane varying as a function for time based on the feature of the first lane information generated through the lane feature generating unit, and for sensing whether a fault detection of the first lane information exists based on the identified degree of variation; and a lane information correcting unit for correcting an fault-detected first lane information when the fault detection of the first lane information is sensed through the lane fault detection sensing unit, and for transferring the corrected first lane information to the lane departure warning system.

According to an embodiment, there is provided a method of correcting a lane, the method including receiving first lane information detected by a lane departure warning system; comparing the received first lane information with previously stored second lane information to identify a degree of variation of a lane as a function for time; sensing whether a fault detection of the received first lane information exists according to the identified degree of variation of the lane; correcting the received first lane information when the fault detection of the first lane information is sensed; and transmitting the corrected lane information to the lane departure warning system.

As described above, according to the embodiment, the instant fault detection about the lane information is found by using the previous lane information, and thus, the fault-detected lane information is corrected so that the situation, in which the fault detection is instantly increased under great noise environment or due to the faded lane, may be solved. Thus, the reliability of the lane departure warning system may be improved and user's convenience may be increased

DETAILED DESCRIPTION

Hereinafter, a preferable embodiment will be described in detail with reference to the accompanying drawings.

Hereinafter, the embodiment will be described in detail with reference to the accompanying drawings.

Figure 1:
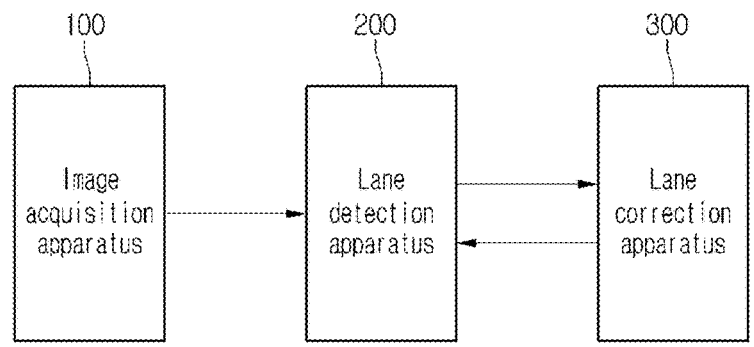
FIG. 1 is a view illustrating a lane correction system according to the embodiment.

FIG. 1 is a view illustrating a lane correction system according to the embodiment.

Referring to FIG. 1, the lane correction system 100 includes an image acquisition apparatus, a lane detection apparatus 200 and a lane correction apparatus 300.

The image acquisition apparatus 100 is installed in front of a vehicle to acquire a forward image in front of the vehicle.

The lane detection apparatus 200 receives the image acquired by the image acquisition apparatus 100 and performs a function for recognizing various information about a lane of a road at which the vehicle is currently located based on the image.

For example, the information about the lane may include a lane equation, a lane type (for example, a solid line or a dotted line), a lane curvature, a lane color, and a lane departure situation.

The lane correction apparatus 300 receives various information about the lane recognized by the lane detection apparatus 200 and identifies a degree of a variation of the lane as a function for time based on the information. The lane correction apparatus 300 corrects the information about the lane and then, transfers the corrected lane information to the lane detection apparatus 200.

In more detail, the image acquisition apparatus 100 is installed at the front of the vehicle, and performs the function for acquiring a color image of a lane in the vehicle forward direction.

The image acquisition apparatus 100 transfers the acquired color image to the lane detection apparatus 200.

The image acquisition apparatus 100 may include a lens having a large angle-of-view such as a wide angle lens or a fisheye lens and a pinhole camera.

The image acquisition apparatus 100 may acquire a 2D image of a 3D subject through the lens having a large angle-of-view in the range of 60° to 120°.

The lane detection apparatus 200 analyzes the color image to recognize the lane included in the color image, so that the lane information is acquired.

Figure 2:
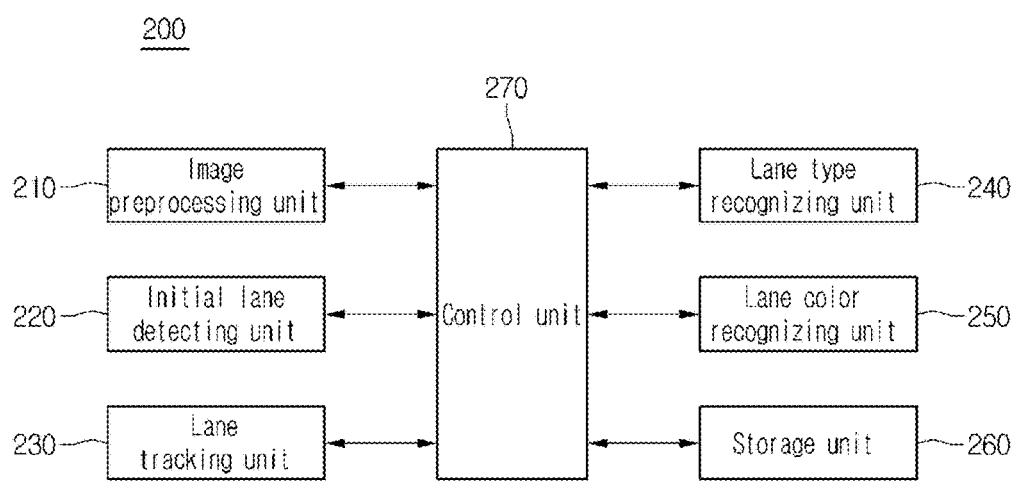
FIG. 2 is a view showing a detailed configuration of a lane detection apparatus depicted in FIG. 1.

FIG. 2 is a detailed view showing the lane detection apparatus depicted in FIG. 2.

Referring to FIG. 2, the lane detection apparatus 200 includes an image preprocessing unit 210, an initial lane detecting unit 220, a lane tracking unit 230, a lane type recognizing unit 240, a lane color recognizing unit 250, a storage unit 260, and a control unit 270.

The image preprocessing unit 210 receives a forward image in front of the vehicle (color image) acquired through the image acquisition apparatus 100, calculates an integral image of the forward image in front of the vehicle, and outputs the integral image.

The initial lane detecting unit 220 may detect an initial lane equation using the integral image input from the image preprocessing unit 210.

The lane tracking unit 230 may obtain a new lane equation using a previous lane equation if the previous lane equation exists.

The lane type recognizing unit 240 may perform a function for recognizing whether a lane is a solid line or a dotted line.

The lane color recognizing unit 250 may perform a function for recognizing whether a color of a lane is white, yellow or blue, such that the lane color recognizing unit 250 may obtain information about whether a lane is a center line or a dedicated bus lane.

The storage unit 260 stores various information and data needed to operate the lane detection apparatus 200 and performs a function for providing the stored information or data according to requests of each component.

The storage unit 260 may include a storage medium having at least one of a flash memory type, a hard disk type, a multimedia card micro type, a card type of memory (for example, SD or XD memory), RAM, and EEPROM.

The control unit 270 controls overall operations of the lane detection apparatus 200.

Specifically, the control unit 270 controls such that various information about the lane is exactly detected and recognized.

Further, the control unit 270 senses whether a collision occurs based on various information about the detected and recognized lane, and generates a warning signal according to the sensing result.

Hereinafter, the above elements will be described in more detail.

The image preprocessing unit 210 receives the forward image in front of the vehicle. The image preprocessing unit 210 selects the G-channel component of color components of the received forward image, calculates an integral image of the G channel component and outputs the integral image. Here, the reason why the G-channel component is selected is because the discrimination power of G-channel component with respect to a lane in a tunnel at night is greater than those of the other channel components. Thus, although the R or B channel component is selectable from the image to perform the function that will be described below, it is preferable to use the G channel image.

Meanwhile, the image preprocessing unit 210 may perform an additional function for correcting the image when the distortion or error occurs in the received image.

The control unit 270 determines whether a previous lane equation exists to detect an initial lane equation by controlling the initial lane detecting unit 200 according to the determination result.

In detail, if a valid previous lane equation does not exist, the initial lane detecting unit 220 detects the initial lane equation by using the integral image of the G channel calculated by the image preprocessing unit 210.

That is, the initial lane detecting unit 220 calculates a subject region for the lane detection from the integral image input from the image preprocessing unit 210. The subject region for the lane detection may be obtained from the image region corresponding to a rectangular area in the range of 3 m to 30 m from the center of the front of a vehicle (for example, the center of a vehicle hood) in a forward direction of the vehicle and in the range of −4 m to 4 m in a left and right direction about the center.

Next, the initial lane detecting unit 220 extracts candidate points for the lane from the lane detection subject region. For example, the initial lane detecting unit 220 extracts the lane candidate points by using a lane candidate point template having a continuous step function at the same width. That is, if the value obtained by performing the convolution of the integral image and the lane candidate points in the subject area for the detection of the lane is equal to a predetermined threshold value or above, the initial lane detecting unit 220 may extract the corresponding coordinate as the lane candidate point.

To this end, the initial lane detecting unit 220 calculates the width of the lane candidate point template in which the width of the lane candidate point template may be set in correspondence with the width of the painted lane of a road.

When the lane candidate point is obtained, the initial lane detecting unit 220 performs the clustering of the lane candidate point and calculates the lane equation with respect to the extracted lane candidate clusters.

Meanwhile, if a previous lane information exists, the control unit 270 controls the lane tracking unit 230 to track a new lane equation based on the previous lane equation.

First, when the previous lane information exists, the lane tracking unit 230 sets a region of interest at the previous lane and extracts the lane candidate point from the region of interest. The region of interest may be set within the range of 60 cm to the left and right from the point on the previous lane equation. The region of interest may be suitably set by a user by taking a calculation speed and an accuracy into consideration.

The method of extracting the lane candidate point in the region of interest may use the lane candidate point template as in the initial lane extraction.

Meanwhile, the lane candidate point placed at the rightmost position in the region of interest of a left lane may be selected as the representative candidate point and the lane candidate point placed at the leftmost position in the region of interest of a right lane may selected as the representative candidate point. In this case, when the lane diverges into two stands, it is possible to select the lane candidate point on the original lane other than the candidate point on the new lane, so it is possible to continuously track the current lane even if one lane in the region of interest is divided into two lanes.

Next, the lane tracking unit 230 selects a valid lane candidate point from the extracted lane candidate points by using a RANdom Sample Concensus (RANSAC) algorithm. The RANSAC algorithm is for effectively removing an outlier from a model fitting. The RANSAC algorithm selects only the inlier from the extracted left and right lane candidate points by using a hyperbola equation serving as the fitting model. An inlier threshold used in the RANSAC algorithm may be 20 cm (which is one lane width and must be converted into a distance in image coordinates by using a matrix (PT)) and the number of repeating times may be previously set. For example, the number of repeating times may be set as 100 times by taking a system load into consideration. The following is a procedure for selecting the inlier corresponding to the valid lane candidate point by using the RANSAC algorithm.

Then, the lane tracking unit 230 updates a new lane equation by applying Kalman filter while utilizing the valid lane candidate point selected through the RANSAC algorithm as a measurement. Meanwhile, if the number of valid lane candidate points selected from the left or right region of interest is less than 10, the valid lane candidate points in the region of interest are not included in the measurement. If the number of valid lane candidate points selected from the left and right regions of interest is less than 10, the update process is not performed and it is determined that there is no lane equation.

Meanwhile, the lane candidate point may not exist in the region of interest due to a vibration caused when driving a vehicle on a road, a temporary disconnection of a lane or a lighting variation. As a scheme for overcoming the above problems, an Extended Kalman Filtering (EKF) scheme, which may track a non-linear equation and is robust to Gaussian noise, is preferably used to track a lane.

If the lane tracking is completed, the lane type recognizing unit 240 may determine whether the lane is a dotted line or a solid line and calculate a lane curvature. The recognition for the dotted line or the solid line is performed as follows. First, it is recognized whether the lane is a dotted line or a solid line by using a pixel value on the lane located within the range of 5 m to 20 m in the lane equation of the forward image in front of the vehicle and pixel values near the lane. That is, a G channel intensity is scanned with 20 pixels located to the left and right about a point sampled at a predetermined interval (for example, 1 m) on each lane. A point, in which a difference between the maximum value and the minimum value exceeds a preset threshold value, is regarded as a point on the lane, and a point, in which the difference between the maximum value and the minimum value is less than the preset threshold value, is regarded as a point on a road area where the lane is cut. The ratio of the number of points on the lane is calculated based on the total number of points in the region corresponding to 5 m to 20 m in front of the vehicle. If the ratio exceeds 0.9, the lane is regarded as the sold line, and the ratio is less than 0.9, the lane is regarded as the dot line.

The curvature of the lane may be calculated with respect to the lane located within the range of 15 m to 30 m from the detected lane.

The lane color recognizing unit 250 may recognize the color of the lane.

Although the scheme of obtaining various information through the lane detection has been described above, this is illustrative purpose only and the scheme of detecting the lane may be modified within the technology generally known in the art.

That is, as the scheme of detecting and recognizing the lane, one of a scheme of using the well-known Hough transformation, a scheme of using a histogram, and a scheme of using edge connection information may be used.

Figure 3:
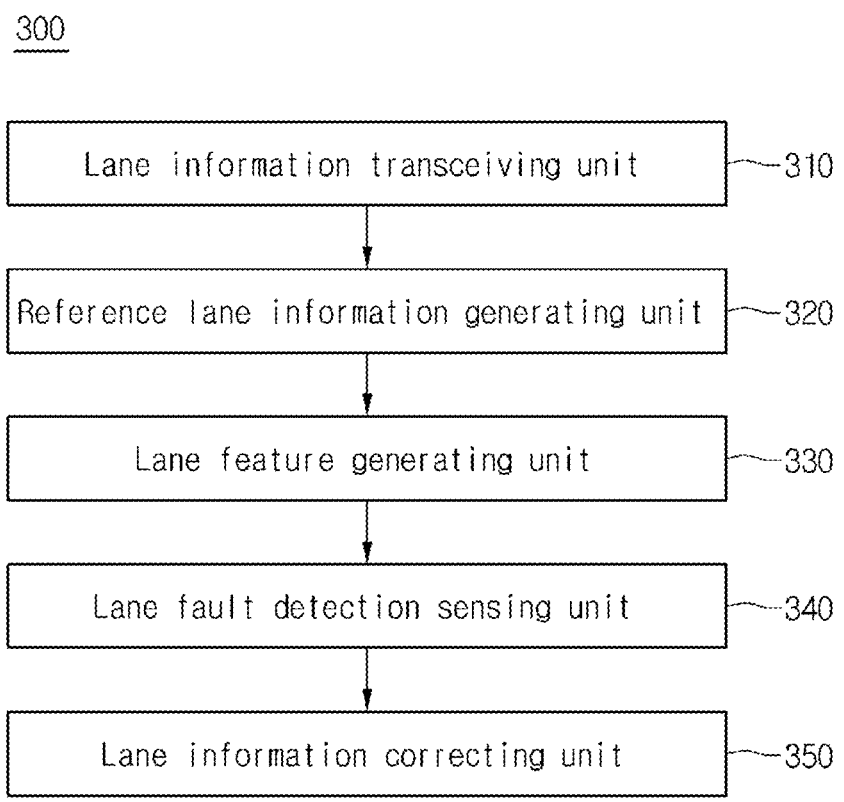
FIG. 3 is a view showing a detailed configuration of a lane correction apparatus depicted in FIG. 1.

FIG. 3 is a view showing a detailed configuration of the lane correction apparatus depicted in FIG. 1.

Referring to FIG. 3, the lane correction apparatus 300 includes a lane information transceiving unit 310, a reference lane information generating unit 320, a lane feature generating unit 330, a lane fault detection sensing unit 340, and a lane information correcting unit 350.

The lane information transceiving unit 310 is connected to the lane detection apparatus 200 to receive lane information detected through the lane detection apparatus 200.

The lane information transceiving unit 310 transmits error-corrected lane information to the lane detection apparatus 200 when an error occurs in the received lane information and transmits the received lane information to the lane detection apparatus 200 when the normal lane information is received.

In the description below, 't' denotes lane information detected at a present time point and 't−1' denotes lane information detected in the past, that is, reference lane information.

The reference lane information generating unit 320 generates the reference lane information by using the lane information received through the lane information transceiving unit 310.

The reference lane information generating unit 320 analyzes the lane information received for a predetermined time, and when information having a similar pattern is continuously input (if it satisfies a logic formula of the lane fault detection sensing unit later), the reference lane information generating unit 320 registers the lane information as the reference lane information.

The reference lane information may be expressed as following Equation 1:

$$L_{left,t-1}(x) = a_{left,t-1}x^2 + b_{left,t-1}x + c_{left,t-1}$$

$$L_{right,t-1}(x) = a_{right,t-1}x^2 + b_{right,t-1}x + c_{right,t-1} \quad \text{[Equation 1]}$$

In Equation 1, $L_{left,t-1}(x)$ is the reference lane information for a left lane generated by using the previous lane information, and $L_{right,t-1}(x)$ is the reference lane information for a right lane generated by using the previous lane information.

The lane feature generating unit 330 extracts features of the reference lane information and the current lane information received at the present time point through the lane information transceiving unit 310.

The received current lane information may be expressed as Equation 2:

$$L_{left,t}(x) = a_{left,t}x^2 + b_{left,t}x + c_{left,t}$$

$$L_{right,t}(x) = a_{right,t}x^2 + b_{right,t}x + c_{right,t} \quad \text{[Equation 2]}$$

In Equation 2, $L_{left,t}(x)$ is the lane information for a left lane generated by using the current receive lane information, and $L_{right,t}(x)$ is reference the lane information for a right lane currently received.

Further, the feature of the lane information may include a degree of variation of a lane angle, a degree of variation of an upper lane width and a degree of variation of a lower lane width as a function of time recognized based on the lane angle, the upper lane width and the lower lane width.

To this end, the lane feature generating unit 330 generates a left lane angle and a right lane angle corresponding to the reference lane information and the current lane information and registers them.

Then, the lane feature generating unit 330 identifies the variation values of the left lane angle corresponding to the registered current lane information and the left lane angle corresponding to the reference lane information.

The variation value of the left lane angle may be obtained from Equation 3:

$$\theta_{left,diff} = a\tan(b_{left,t}) - a\tan(b_{left,t-1}) \quad \text{[Equation 3]}$$

In addition, the lane feature generating unit 330 identifies the variation values of the right lane angle corresponding to the registered current lane information and the right lane angle corresponding to the reference lane information.

The variation value of the right lane angle may be obtained from Equation 4:

$$\theta_{right,diff} = a\tan(b_{right,t}) - a\tan(b_{right,t-1})$$ [Equation 4]

The lane feature generating unit 330 identifies the top end width of the current lane based on the current lane information and the top end width of the reference lane based on the reference lane information.

The top end width may be obtained from Equation 5:

$$W_{top} = L_{right}(x_{top}) - L_{left}(x_{top})$$ [Equation 5]

In addition, the lane feature generating unit 330 identifies the bottom end width of the current lane based on the current lane information and the bottom end width of the reference lane based on the reference lane information.

The bottom end width may be obtained from Equation 6:

$$W_{bottom} = L_{right}(x_{bottom}) - L_{left}(x_{bottom})$$ [Equation 6]

The top end location $X_{top}$ and the bottom end location $X_{bottom}$ are defined as follows:

where, $\begin{cases} x_{top} = (1 - 0.38) \times \text{height of image} \\ x_{bottom} \text{ is height of image} \end{cases}$ Then, the lane feature generating unit 330 identifies the variation values of the top end widths of the identified current lane and the reference lane.

The variation value of the top end width may be obtained from Equation 7:

$$W_{top,diff}(x_1) = W_t(x_1) - W_{t-1}(x_1)$$ [Equation 7]

Then, the lane feature generating unit 330 identifies the variation values of the bottom end widths of the identified current lane and the reference lane.

The variation value of the bottom end width may be obtained from Equation 8:

$$W_{bottom,diff}(x_2) = W_t(x_2) - W_{t-1}(x_2)$$ [Equation 8]

As described above, the lane feature generating unit 330 generates the lane feature such as variation values of the left lane angle, right lane angle, and top end lane width and bottom end lane width, and outputs the lane feature.

The lane fault detection sensing unit 340 senses a fault detection of the current lane information based on the lane feature generated through the lane feature generating unit 330.

The fault detection may be sensed as following logic equations.

First, the lane fault detection sensing unit 340 compares the angle variation vale of the left lane with a predetermined threshold value according to Logic equation 1:

$$F_{left,\theta} = \begin{cases} 1, & \theta_{left,diff} \geq \theta_{th} \\ 0, & \text{otherwise} \end{cases}$$ [Logic equation 1]

Further, the lane fault detection sensing unit 340 compares the angle variation vale of the right lane with a predetermined threshold value according to Logic equation 2:

$$F_{right,\theta} = \begin{cases} 1, & \theta_{right,diff} \geq \theta_{th} \\ 0, & \text{otherwise} \end{cases}$$ [Logic equation 2]

The lane fault detection sensing unit 340 compares the width variation vale of the top end lane with a predetermined threshold value according to Logic equation 3:

$$F_{TopW} = \begin{cases} 1, & \theta_{diff} \geq \theta_{th} \\ 0, & \text{otherwise} \end{cases}$$ [Logic equation 3]

The lane fault detection sensing unit 340 compares the width variation vale of the bottom end lane with a predetermined threshold value according to Logic equation 4:

$$F_{BotW} = \begin{cases} 1, & \theta_{diff} \geq \theta_{th} \\ 0, & \text{otherwise} \end{cases}$$ [Logic equation 4]

Further, the lane fault detection sensing unit 340 identifies whether a reference lane exists based on Logic equation 5:

$$F_{Prev} = \begin{cases} 1, & L_{t-1} \text{ is updated} \\ 0, & \text{otherwise} \end{cases}$$ [Logic equation 5]

Then, the lane fault detection sensing unit 340 applies the result vale obtained from Logic equations 1 to 5 to following Logic equation 6:

$$F_{prediction} = F_{prev} \cdot (F_{right,\theta} + F_{left,\theta}) \cdot (F_{TopW} + F_{BotW})$$ [Logic equation 6]

In Logic equation 6, '+' signifies that the result becomes '1' when at least one of two conditions is satisfied, and '·' signifies that the result becomes '1' when both conditions are satisfied.

The lane fault detection sensing unit 340 applies the result value of Logic equation 6 to following Logic equation 7, so that the fault detection of the lane information detected at the present time point occurs:

$$L_t = \begin{cases} L_{t-1}, & F_{prediction} = 1 \\ L_t, & \text{otherwise} \end{cases}$$ [Logic equation 7]

In Logic equation 7, if the result value of Logic equation 7 is '1', it signifies that an error exists in the lane information detected at the present time point, and if the result value of Logic equation 7 is '0', it signifies that the lane information detected at the present time point is correct.

The lane information correcting unit 350 receives the lane fault detection sensing result sensed through the lane fault detection sensing unit 340, and generates lane information to be transmitted to the lane detection apparatus 200 according to the received sensing result.

If the lane information is normally detected, the lane information correcting unit 350 transmits the lane information itself received from the lane detection apparatus 200. And, if the lane information is fault-detected, the lane information correcting unit 350 transmits the generated reference lane information (past lane information) to the lane detection apparatus 200.

Meanwhile, the above sensing of the lane fault detection is performed based on the reference lane information according to the previous detected lane information.

If an error exists in the reference lane information, the lane fault detection may be continuously sensed.

Thus, if the lane fault detection is repeatedly sensed the predetermined number of times or more by the lane fault detection sensing unit 340, the reference lane generating unit 320 deletes the previously generated reference lane information and regenerates new reference lane information by using the lane information input at the present time point.

Further, if the normal lane information is continuously detected by the lane detection apparatus 200, the lane fault detection sensing unit 340 updates the reference lane information by using the detected lane information.

As described above, according to the embodiment, the instant situation of the fault detection about the lane information is found by using the previous lane information, and thus, the fault-detected lane information is corrected so that the situation, in which the fault detection is instantly increased under a great noise environment or in a faded lane, may be solved. Thus, the reliability of the lane departure warning system may be improved and user convenience may be increased.

Figure 4:
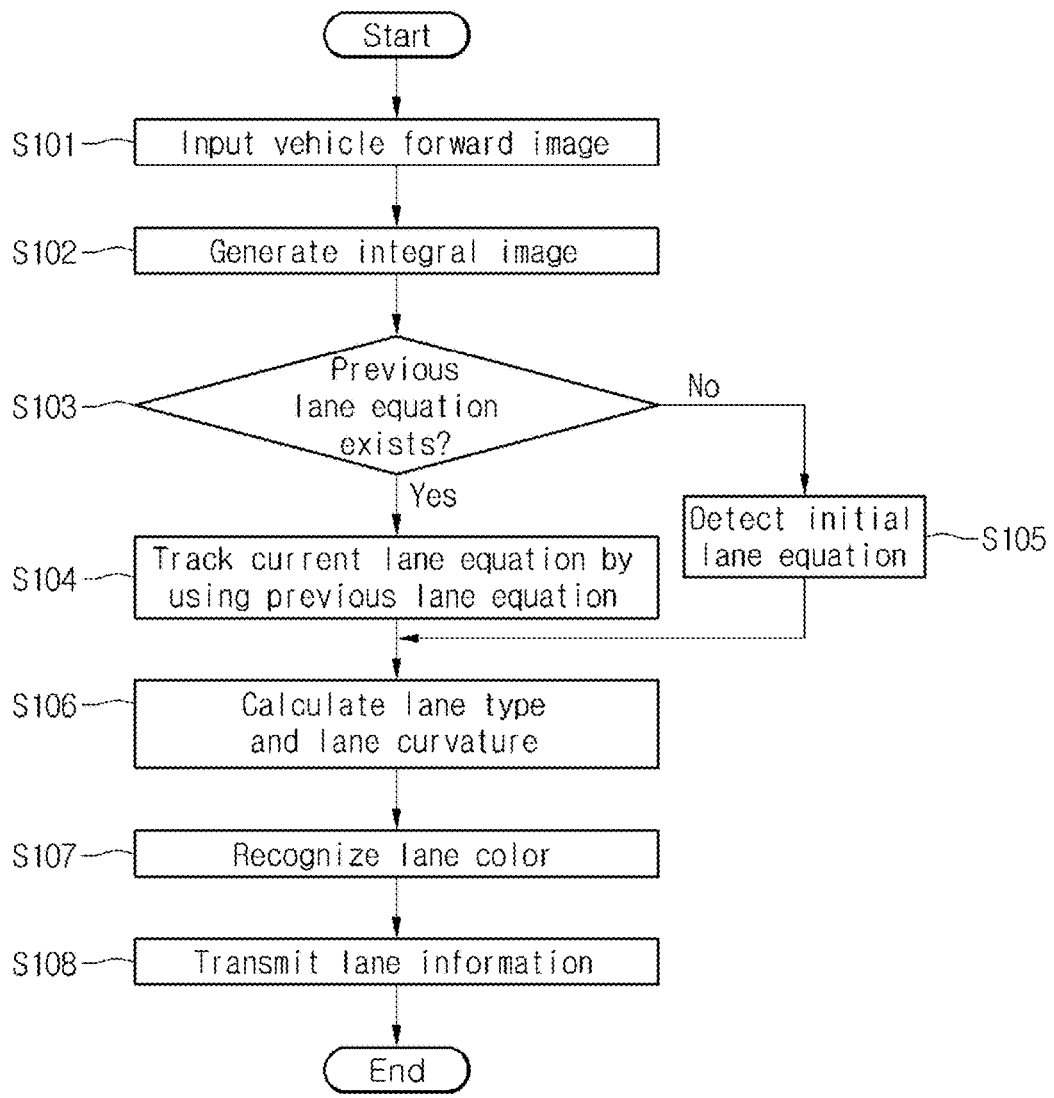
FIG. 4 is a view illustrating a method of detecting lane information according to the embodiment.

FIG. 4 is a view illustrating a method of detecting lane information according to the embodiment.

Referring to FIG. 4, in step S101, the lane detection apparatus 200 receives the forward image in front of the vehicle acquired through the image acquisition apparatus 200.

In step S102, the lane detection apparatus 200 generates the integral image of the input image.

In step S103, as the integral image is generated, the lane detection apparatus 200 determines whether a previous lane equation exists.

In step S104, if the previous lane equation exists in step S103, a current lane equation is tracked by using the previous lane equation.

In step S105, if the previous lane equation does not exist in step S103, an initial lane equation is detected.

Then, in step S106, a type and a curvature of the current lane are calculated by using the tracked current lane equation or the detected initial lane equation.

In step S107, the lane detection apparatus 200 recognizes a color of a lane.

Then, in step S108, the lane information about the current lane recognized above is transmitted to the lane correction apparatus 300.

FIGS. 5 to 9 are flowcharts illustrating by steps a method of correcting a lane.

Figure 5:
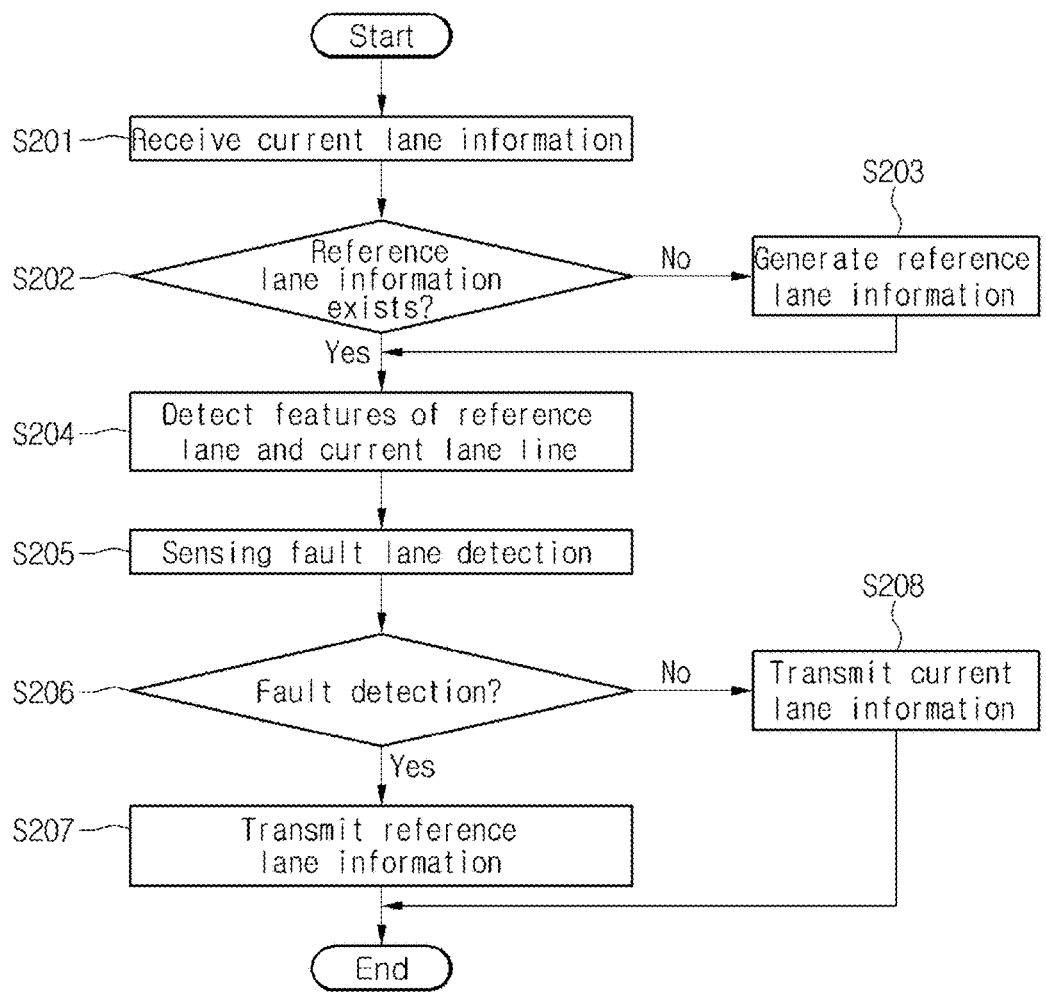
FIGS. 5 to 9 are flowcharts illustrating by steps a method of correcting a lane.

First, referring to FIG. 5, in step S201, the lane correction apparatus 300 receives the lane information detected from the lane detection apparatus 200.

In step S202, if the lane information is received, the lane correction apparatus 300 determines whether the reference lane information generated by using the previously received lane information exists.

In step S203, if the reference lane information does not exist in step S202, the lane correction apparatus 300 receives the lane information detected through the lane detection apparatus 200 during a predetermined time of 't' and generates the reference lane information by using the received lane information.

The procedure of generating the reference lane information (S203) will be described with reference to FIG. 6.

Then, in step S204, the lane correction apparatus 300 detects the lane feature by using the reference lane information and the currently received lane information.

The lane feature is detected based on the left lane angle, the right lane angle, the top end lane width and the bottom end lane width which correspond to the reference lane information and the currently received lane information, respectively.

That is, the lane feature signifies the variation degree of the lane information detected according to time. The variation degree of the lane information may include the variation values of the left lane angle, the right lane angle, the top end lane width and the bottom end lane width.

The variation value of the left lane angle is the difference value between the left lane angle corresponding to the currently received lane information and the left lane angle corresponding to the reference lane information.

The variation value of the right lane angle is the difference value between the right lane angle corresponding to the currently received lane information and the right lane angle corresponding to the reference lane information.

The variation value of the top end lane width is the difference value between the top end lane width corresponding to the currently received lane information and the top end lane width corresponding to the reference lane information.

The variation value of the bottom end lane width is the difference value between the bottom end lane width corresponding to the currently received lane information and the bottom end lane width corresponding to the reference lane information.

In step S205, if the above lane features are detected, the lane correction apparatus 300 compares the lane features with the threshold values, respectively, to identify whether the fault detection occurs in the currently received lane information.

Then, in step S206, it is determined whether an error occurs in the detection of the currently received lane information.

In step S207, if an error occurs in the detection of the currently received lane information in step S206, the lane correction apparatus determines that an error exists in the currently received lane information and thus, transmits the reference lane information to the lane detection apparatus 200.

In step S208, if the currently received lane information is normally detected in step S206, the lane correction apparatus 300 transmits the currently received lane information itself to the lane detection apparatus.

Hereinafter, the procedure of generating the reference lane information will be described.

First, in step S301, if the reference lane information does not exist, the lane correction apparatus 300 receives the lane information detected by the lane detection apparatus 200 for the predetermined time t.

In step S302, the lane correction apparatus 300 detects the features of the lane information received for the predetermined time.

Then, in step S303, the lane correction apparatus 300 compares the detected features with each other. The comparing of step S303 is performed in the same way as that of the sensing of the fault detection depicted in FIG. 5.

That is, the lane correction apparatus 300 compares the features of the lane information input for the predetermined time with each other to identify whether the input lane information is normally detected. This may be implemented by identifying whether the lane information having a similar pattern is continuously detected for the predetermined time, that is, whether the degree of variation of the lane information as a function for time is equal to the threshold value or below.

Then, in step S304, the lane correction apparatus 300 identifies whether the features of the lane information input for the predetermined time has a similar pattern to each other.

In step S305, if the features of the lane information input for the predetermined time has a similar pattern to each other in step S304, the most recently received lane information is registered as the reference lane information, and otherwise, the procedure returns to step S301.

Hereinafter, the procedure of detecting a lane feature will be described in detail.

Figure 7:
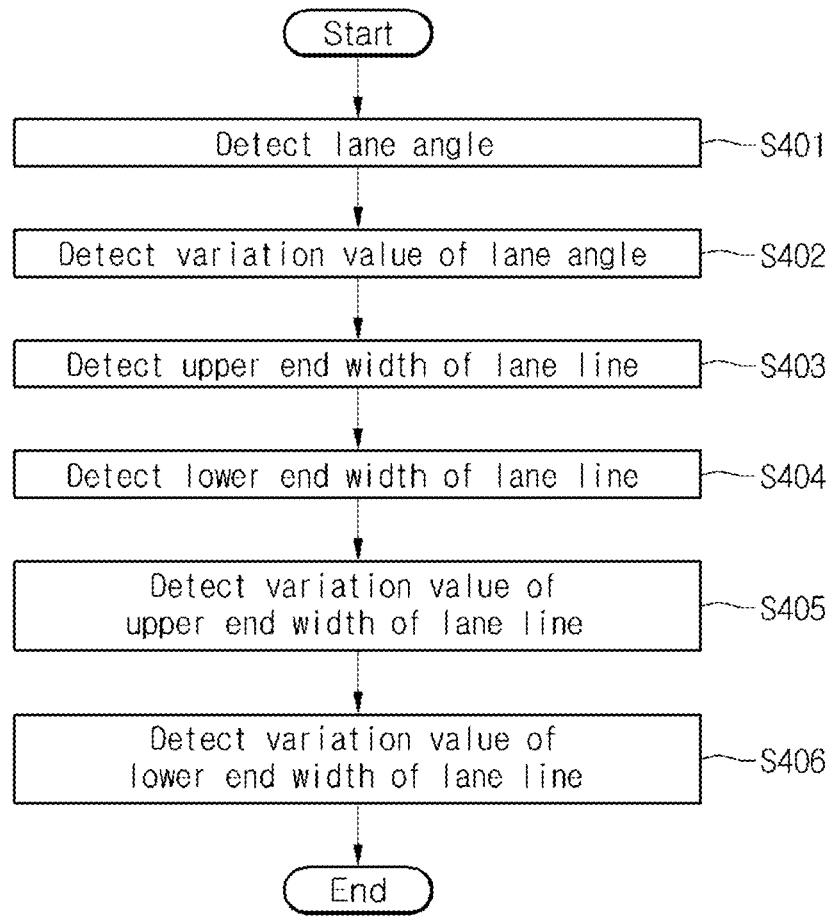

Referring to FIG. 7, in step S401, the lane correction apparatus 300 detects an angle of a lane.

That is, the lane correction apparatus 300 detects a left lane angle and a right lane angel about a previous lane by using reference lane information.

Further, the lane correction apparatus 300 detects a left lane angle and a right lane angel about a current lane by using currently received lane information.

In step S402, the lane correction apparatus 300 detects a variation value of the lane angle as a function for by using the detected lane angle.

Next, in steps S403 and S404, the lane correction apparatus 300 detects a lane width of a current lane by using currently received lane information and a lane width of a previous lane by using previously received lane information.

Here, the lane widths include a top end lane width of an upper portion and a bottom end lane width of a lower portion of the lane.

Then, in steps S405 and S406, the lane correction apparatus 300 detects a variation of a lane width by using the detected lane width.

That is, the lane correction apparatus 300 detects a variation value according to a difference between the top end lane width of the detected current lane and the top end lane width of the previous lane.

Further, the lane correction apparatus 300 detects a variation value according to a difference between the bottom end lane width of the detected current lane and the bottom end lane width of the previous lane.

Thus, the lane correction apparatus 300 detects the angle variation value and width variation value of the lane according to time.

Hereinafter, the procedure of sensing a fault detection of a lane will be described.

Figure 8:
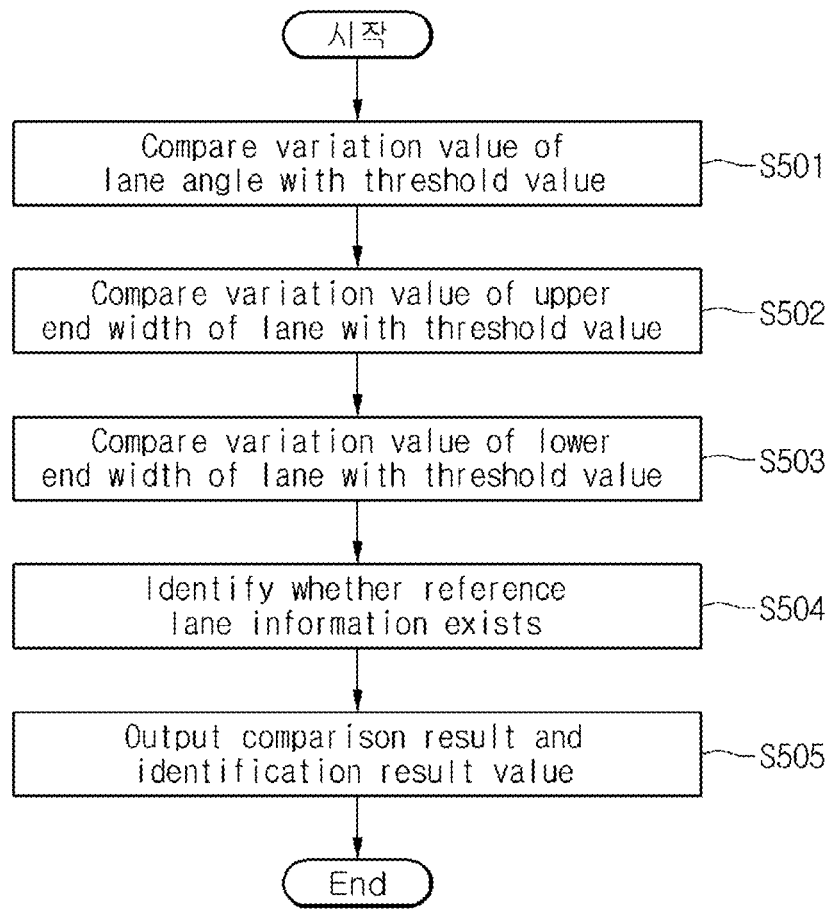

Referring to FIG. 8, in step S501, the lane correction apparatus 300 compares an angle variation value of a lane with a threshold value.

That is, the lane lien correction apparatus 300 first-compares an angle variation value of a left lane with a predetermined first threshold value. In addition, the lane lien correction apparatus 300 second-compares an angle variation value of a right lane with a predetermined second threshold value.

Then, in step S502, the lane lien correction apparatus 300 third-compares a top end width variation value of the detected lane with a predetermined third threshold value.

In step S503, the lane lien correction apparatus 300 forth-compares a bottom end width variation value of the detected lane with a predetermined fourth threshold value.

In step S504, the lane correction apparatus 300 identifies whether the reference lane information exists.

In step S505, if the comparing and identifying are completed, the lane correction apparatus 300 outputs the result values of the first to fourth comparisons and the identifying result value.

Then, the lane correction apparatus 300 uses the first to fourth comparison result values and the identifying result value to identify whether a fault detection of the currently received lane information occurs, so that the lane correction apparatus 300 determines whether to correct the lane information.

Figure 9:
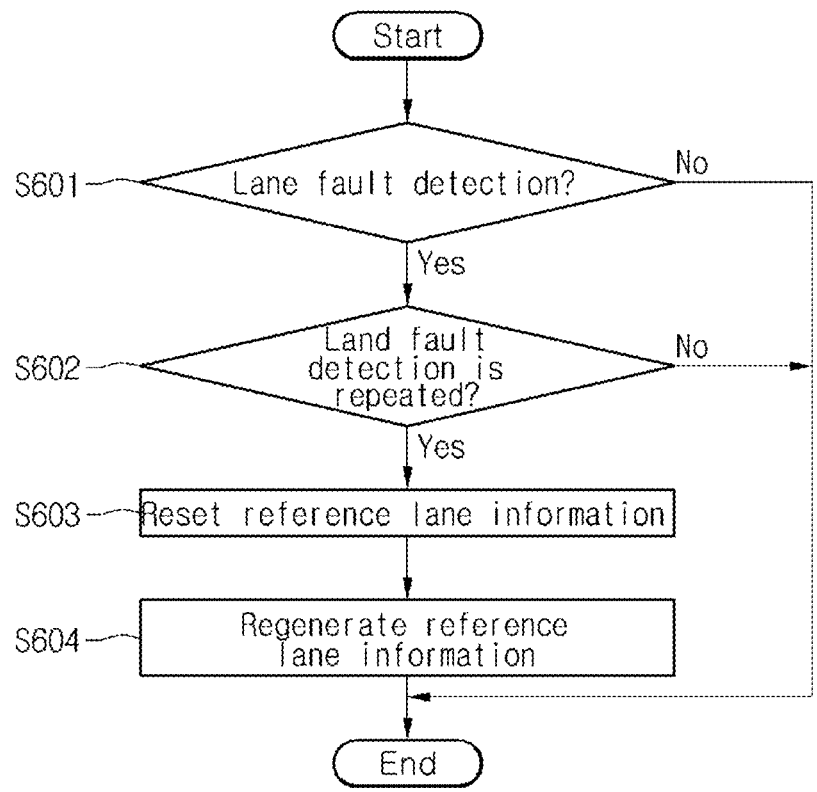

Then, referring to FIG. 9, in step S601, the lane correction apparatus 300 determines whether the fault detection of the currently received lane information is sensed.

In step S602, as the determination result, if an error exists in the detection of the lane information, it is determined whether the fault detection of the lane information is repeatedly sensed.

In step S603, if the fault detection of the lane information is repeatedly sensed in step 602, the lane correction apparatus 300 resets the previously generated reference lane information.

Figure 6:
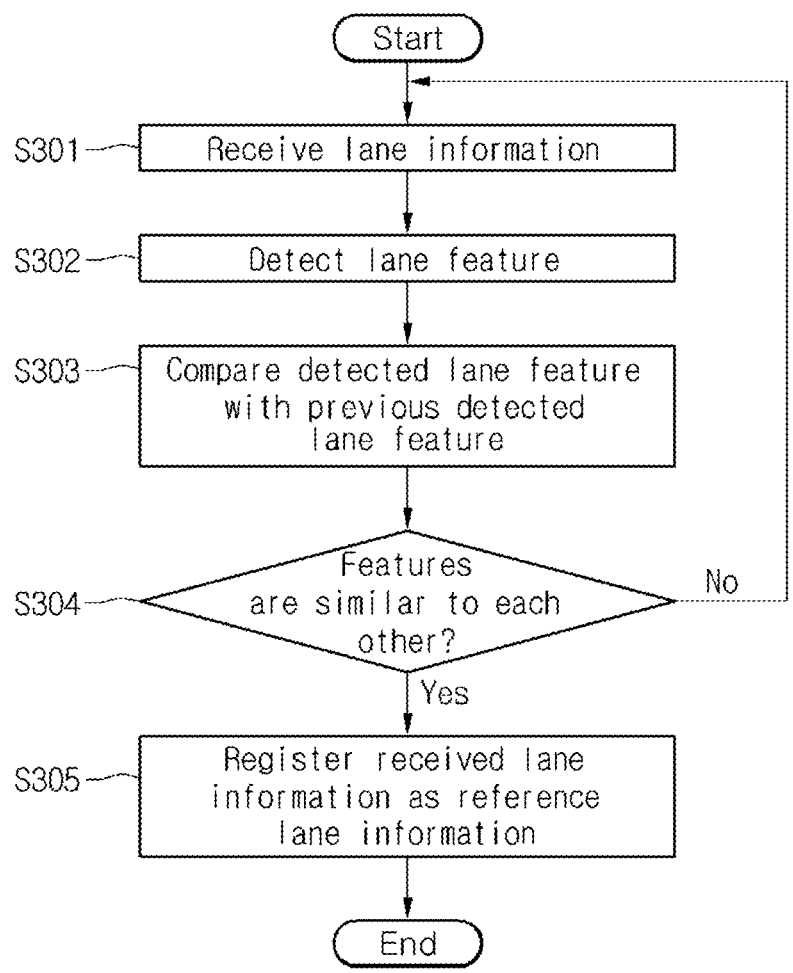

In step S604, the lane correction apparatus 300 regenerates the reference lane information as shown in FIG. 6.

As described above, according to the embodiment, the instant fault detection about the lane information is found by using the previous lane information, and thus, the fault-detected lane information is corrected so that the situation, in which the fault detection is instantly increased under great noise environment or in a faded lane, may be solved. Thus, the reliability of the lane departure warning system may be improved and user's convenience may be increased.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lane correction system comprising:
    an image acquisition apparatus for acquiring a forward image in front of a vehicle; a lane detection apparatus for receiving the forward image from the image acquisition apparatus to detect lane information based on the forward image; and
    a lane correction apparatus for receiving first lane information detected at a present time from the lane detection apparatus and for sensing whether a fault detection of the first lane information exists by comparing the first lane information with second lane information that is previously stored;
    wherein the lane information includes information about at least one of a lane type, a lane color, and a lane departure situation; and wherein the fault detection is caused by a faded lane or a noise environment.

2. The lane correction system of claim 1, wherein the second lane information is reference lane information generated based on lane information transferred from the lane detection apparatus during a predetermined time in the past, and the lane correction apparatus generates the second lane information by using the first lane information detected through the lane detection apparatus during a predetermined time from a present time point.

3. The lane correction system of claim 1, wherein the first lane information and the second lane information include information about at least one of a left lane angle, a right lane angle, a top end lane width, or a bottom end lane width.

4. The lane correction system of claim 1, wherein the lane correction apparatus corrects the first lane information when the fault detection is sensed in the first lane information and transfers the corrected first lane information to the lane detection apparatus.

5. The lane correction system of claim 4, wherein the lane correction apparatus detects a feature of the first lane information by using the received first and second lane information, and senses whether the fault detection of the first lane information exists by using the detected feature.

6. The lane correction system of claim 5, wherein the feature includes a degree of variation of a lane information as a function for time.

7. A lane correction apparatus comprising:
a lane information transceiver connected to a lane departure warning system for receiving first lane information detected by the lane departure warning system;
a lane feature generator for comparing the first lane information received at a present time point through the lane information transceiver with second lane information previously stored in order to generate a feature of the first lane information according to a comparison result; and
a lane fault detection sensor for identifying a degree of variation of a lane varying as a function of time based on the feature of the first lane information generated through the lane feature generator, and for sensing whether a fault detection of the first lane information exists based on the identified degree of variation;
wherein the fault detection is caused by a faded lane or a noise environment.

8. The lane correction apparatus of claim 7, further comprising a reference lane information generating unit for generating a second lane information by using a plurality of first lane information detected by the lane departure warning system during a predetermined time.

9. The lane correction apparatus of claim 8, wherein the reference lane information generating unit generates the second lane information by using the plurality of first lane information when the second lane information does not exist at a time point of receiving the first lane information.

10. The lane correction apparatus of claim 9, wherein the reference lane information generating unit updates the second lane information by using a normally detected first lane information when a normal detection of the first lane information is sensed.

11. The lane correction apparatus of claim 9, wherein the first lane information and the second lane information include information about at least one of a left lane angle, a right lane angle, a top end lane width, or a bottom end lane width.

12. The lane correction apparatus of claim 8, further comprising a lane information correcting unit for correcting a fault-detected first lane information when the fault detection of the first lane information is sensed through the lane fault detection sensing unit, and for transferring the corrected first lane information to the lane departure warning system.

13. A lane correction apparatus comprising:
a lane information transceiver connected to a lane departure warning system for receiving first lane information detected by the lane departure warning system;
a lane feature generator unit for comparing the first lane information received at a present time point through the lane information transceiver with second lane information previously stored in order to generate a feature of the first lane information according to a comparison result; and
a lane fault detection sensor for identifying a degree of variation of a lane information based on the feature of the first lane information generated through the lane feature generator, and for sensing whether a fault detection of the first lane information exists;
wherein the lane information includes information about at least one of a lane type, a lane color, and a lane departure situation; and
wherein the fault detection is caused by a faded lane or a noise environment.

14. The lane correction apparatus of claim 13, further comprising:
a lane information correcting unit for correcting a fault-detected first lane information and transferring the corrected first lane information to the lane departure warning system.

15. The lane correction apparatus of claim 13, further comprising a reference lane information generating unit for generating a second lane information by using a plurality of first lane information detected by the lane departure warning system during a predetermined time,
wherein the reference lane information generating unit generates the second lane information by using the plurality of first lane information when the second lane information does not exist at a time point of receiving the first lane information.

16. The lane correction apparatus of claim 15, wherein the reference lane information generating unit updates the second lane information by using a normally detected first lane information when a normal detection of the first lane information is sensed.

17. The lane correction apparatus of claim 15, wherein the first lane information and the second lane information include information about at least one of a left lane angle, a right lane angle, a top end lane width, or a bottom end lane width.

* * * * *